United States Patent
Rico Alvarino et al.

(10) Patent No.: US 10,285,172 B2
(45) Date of Patent: May 7, 2019

(54) SEARCH SPACE DESIGN FOR SEMI-PERSISTENT SCHEDULING (SPS) IN ENHANCED MACHINE-TYPE COMMUNICATIONS

(71) Applicant: QUALCOMM Incorporated, San Diego, CA (US)

(72) Inventors: Alberto Rico Alvarino, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 15/803,740

(22) Filed: Nov. 3, 2017

(65) Prior Publication Data

US 2018/0132212 A1  May 10, 2018

Related U.S. Application Data

(60) Provisional application No. 62/418,198, filed on Nov. 6, 2016.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04B 7/068* (2013.01);
(Continued)

(58) Field of Classification Search
None
See application file for complete search history.

(56) References Cited

U.S. PATENT DOCUMENTS

| 2013/0107809 A1* | 5/2013 | Ko | H04L 5/0053 370/328 |
| 2014/0348092 A1* | 11/2014 | Ihm | H04J 11/0079 370/329 |

(Continued)

OTHER PUBLICATIONS

"3 Generation Partnership Project; Technical Specification Group Radio Access Network; Evolved Universal Terrestrial Radio Access (E-UTRA); Multiplexing and channel coding (Release 14)" 3GPP Standard; 3GPP TS 36.212, 3rd Generation Partnership Project (3GPP), Mobile Competence Centre; 650, Route Des Lucioles; F-06921 Sophia-Antipolis Cedex ; France, vol. RAN WG1, No. V14.0.0, Sep. 29, 2016 (Sep. 29, 2016), pp. 1-148, XP051172641, [retrieved on Sep. 29, 2016].

(Continued)

*Primary Examiner* — Robert M Morlan
(74) *Attorney, Agent, or Firm* — Clint R. Morin; Patterson & Sheridan

(57) ABSTRACT

Certain aspects of the present disclosure generally relate to techniques for detecting downlink control information (DCI). In some cases, by making two different DCIs (e.g., used for different types of transmission schemes—one that supports SPS and one that does not support SPS) the same size, complexity at the UE (in terms of number of blind decodes) may be reduced. Since the DCIs are the same size, the UE may monitor a search space with decoding candidates for both types of DCI by doing a single decode per candidate.

28 Claims, 9 Drawing Sheets

(51) Int. Cl.
    *H04W 16/28* (2009.01)
    *H04B 7/06* (2006.01)
    *H04W 4/70* (2018.01)
(52) U.S. Cl.
    CPC ............ *H04B 7/0617* (2013.01); *H04W 4/70* (2018.02); *H04W 16/28* (2013.01)

(56) References Cited

U.S. PATENT DOCUMENTS

| | | | | |
|---|---|---|---|---|
| 2016/0174194 | A1* | 6/2016 | Suzuki | H04W 76/14 |
| | | | | 370/312 |
| 2018/0026740 | A1* | 1/2018 | Chen | G01N 33/487 |
| | | | | 370/328 |
| 2018/0092051 | A1* | 3/2018 | Dinan | H04L 5/001 |
| 2018/0279229 | A1* | 9/2018 | Dinan | H04W 52/146 |
| 2018/0302886 | A1* | 10/2018 | Pan | H04W 72/0406 |
| 2018/0368117 | A1* | 12/2018 | Ying | H04W 72/042 |

OTHER PUBLICATIONS

"3 Generation Partnership Project; Technical Specification Group Radio Access Network; Evolved Universal Terrestrial Radio Access (E-UTRA); Physical layer procedures (Release 14)" 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V14.0.0 Sep. 29, 2016 (Sep. 29, 2016), pp. 46-263. XP051172656, [retrieved on Sep. 29, 2016].
International Search Report and Written Opinion—PCT/US2017/060179—ISA/EPO—dated Jul. 19, 2018.

* cited by examiner

MPDCCH and PDSCH configured by SPS C-RNTI

| Transmission mode | DCI format | Search Space | Transmission scheme of PDSCH corresponding to MPDCCH |
|---|---|---|---|
| ... | ... | ... | ... |
| Mode 2 | 6-1A | UE specific by C-RNTI | Transmit diversity |
| Mode 6 | 6-1A | UE specific by C-RNTI | Transmit diversity |
| ... | ... | ... | ... |

*FIG. 9*

SEARCH SPACE DESIGN FOR SEMI-PERSISTENT SCHEDULING (SPS) IN ENHANCED MACHINE-TYPE COMMUNICATIONS

CLAIM OF PRIORITY UNDER 35 U.S.C. § 119

The present Application for Patent claims benefit of U.S. Provisional Patent Application Ser. No. 62/418,198, filed Nov. 6, 2016, assigned to the assignee hereof and hereby expressly incorporated by reference herein.

BACKGROUND

Field of the Invention

Certain aspects of the present disclosure generally relate to wireless communications and more specifically to techniques for simplifying downlink control information (DCI) detection.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

In some cases devices, such as MTC and other types of devices, may communicate using a narrowband (NB) region of wider system bandwidth. Utilizing a narrowband region may present challenges for various procedures, such as positioning procedures where positioning reference signals are used to track a location (and/or movement) of devices within a network.

Aspects of the present disclosure provide techniques that may help a UE decode different types of downlink control information (DCI) with a reduced number of blind decodes performed by a UE. Reducing the number of blind decodes may result in reduced power consumption, faster processing, and faster response time. This may be particularly beneficial in the case of certain low cost UEs, which may be very power constrained.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include conserving transmission resources in wireless communication systems.

Aspects of the present disclosure provide a method for wireless communications performed by a user equipment (UE). The method generally includes monitoring for a first downlink control information (DCI) for a first transmission scheme for non-semi persistent scheduling (SPS) and monitoring for a second DCI for a second transmission scheme for SPS, wherein a size of both the first and second DCI is the same, but one or more fields in the second DCI that are specific to the first DCI are not used to determine transmission parameters.

Aspects of the present disclosure provide a method for wireless communications performed by a base station. The method generally includes transmitting a first downlink control information (DCI) for a first transmission scheme for non-semi persistent scheduling (SPS) and transmitting a second DCI for a second transmission scheme for SPS, wherein a size of both the first and second DCI is the same, but one or more fields in the second DCI that are specific to the first DCI are not used to determine transmission parameters.

Numerous other aspects are provided including methods, apparatus, systems, computer program products, computer readable medium, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9 illustrates an example of downlink control information (DCI) formats and search spaces for different transmissions modes, in accordance with certain aspects of the present disclosure

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

Figure 1:
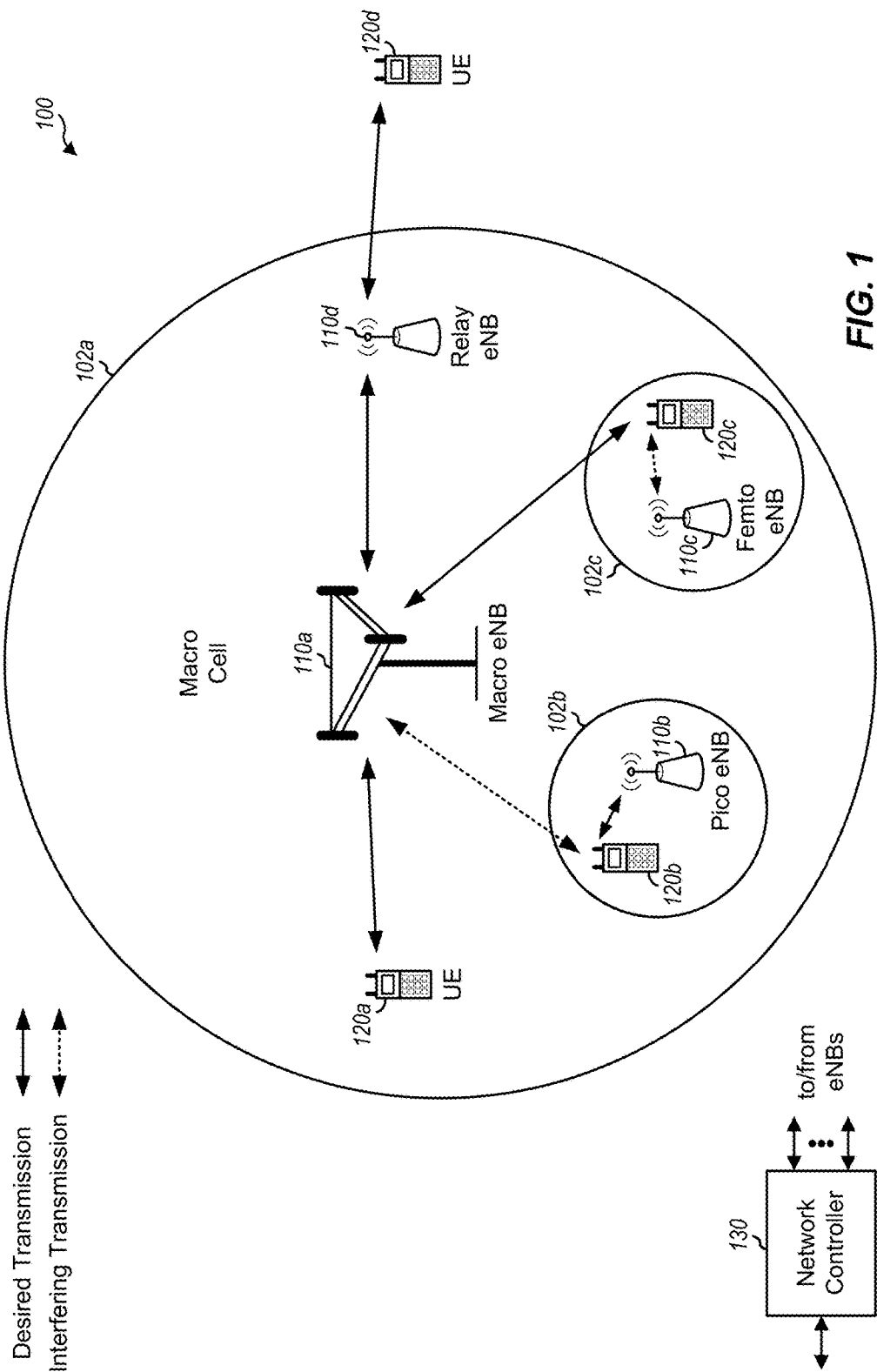
FIG. 1 is a block diagram conceptually illustrating an example wireless communication network, in accordance with certain aspects of the present disclosure.

FIG. 1 illustrates an example wireless communication network 100 with base stations (BSs) and user equipments (UEs), in which aspects of the present disclosure may be practiced.

For example, one or more paging procedure enhancements for certain UEs (e.g., LC MTC UEs, LC eMTC UEs, etc.) in the wireless communication network 100 may be supported. According to the techniques presented herein, the BSs and LC UE(s) in the wireless communication network 100 may be able to determine, from the available system bandwidth supported by the wireless communication network 100, which narrowband region(s) the LC UE(s) should monitor for a bundled paging message transmitted from the BSs in the wireless communication network 100. Also, according to techniques presented herein, the BSs and/or LC UE(s) in the wireless communication network 100 may be able to determine and/or adapt the bundling size for the paging message based on one or more triggers in the wireless communication network 100.

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, navigation devices, gaming devices, cameras, a vehicular device, a drone, a robot/robotic device, a wearable device (e.g., smart watch, smart clothing, smart wristband, smart ring, smart bracelet, smart glasses, virtual reality goggles), a medical device, a healthcare device, etc. MTC UEs include devices such as sensors, meters, monitors, location tags, drones, trackers, robots/robotic devices, etc. UEs (e.g., MTC devices) may be implemented as internet of everything (IoE) or internet of things (IoT) (e.g., narrowband IoT (NB-IoT)) devices.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
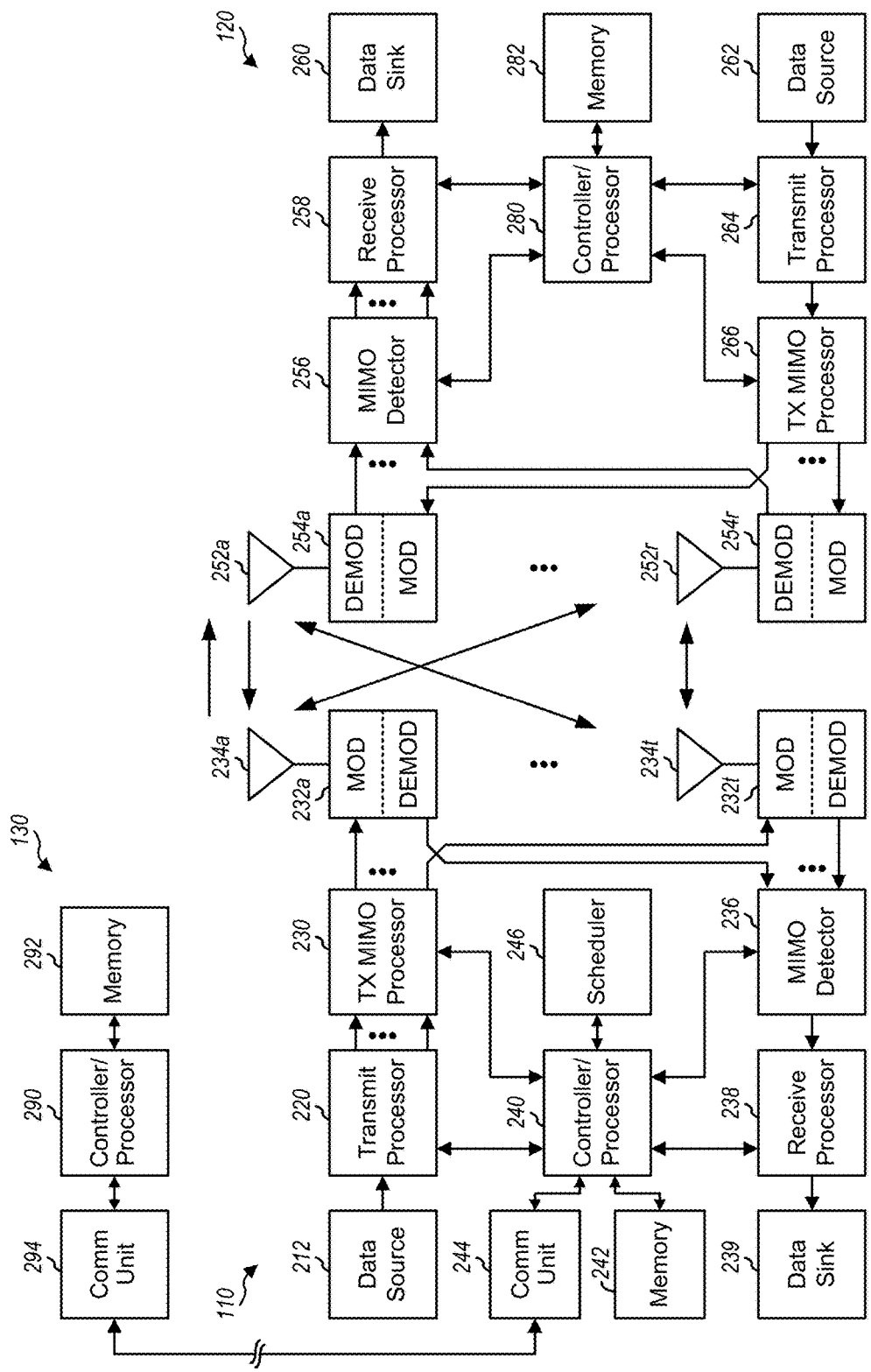
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations illustrated in FIGS. 10, 13, 14, 17 and/or other processes for the techniques described herein. Similarly, controller/processor 280 and/or other processors and modules at UE 120 may perform or direct operations illustrated in FIGS. 11, 12, 15, 16 and/or processes for the techniques described herein. Memories 242 and 282 may store data and program codes for BS 110 and UE 120, respectively. A scheduler 246 may schedule UEs for data transmission on the downlink and/or uplink.

Figure 3:
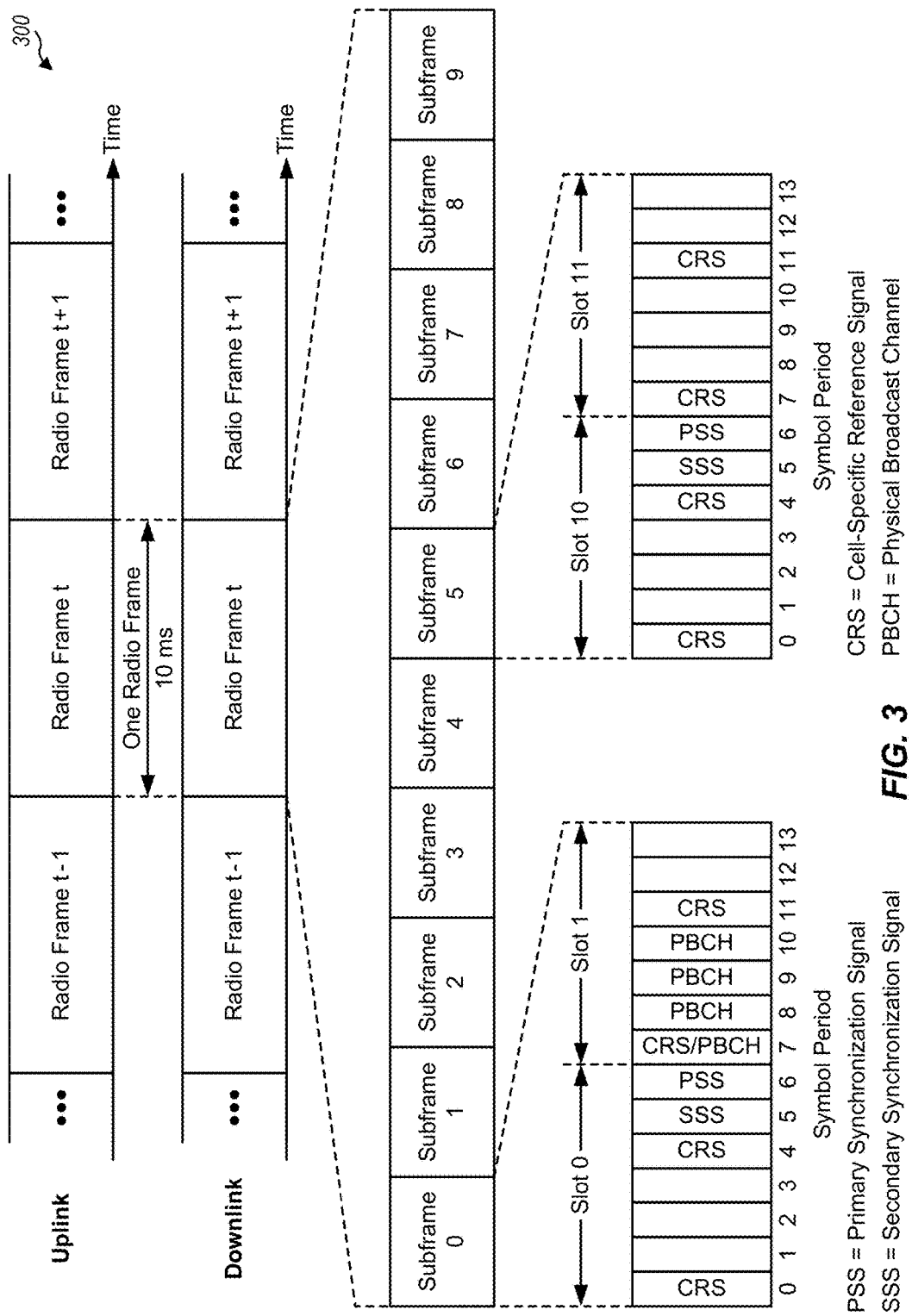
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
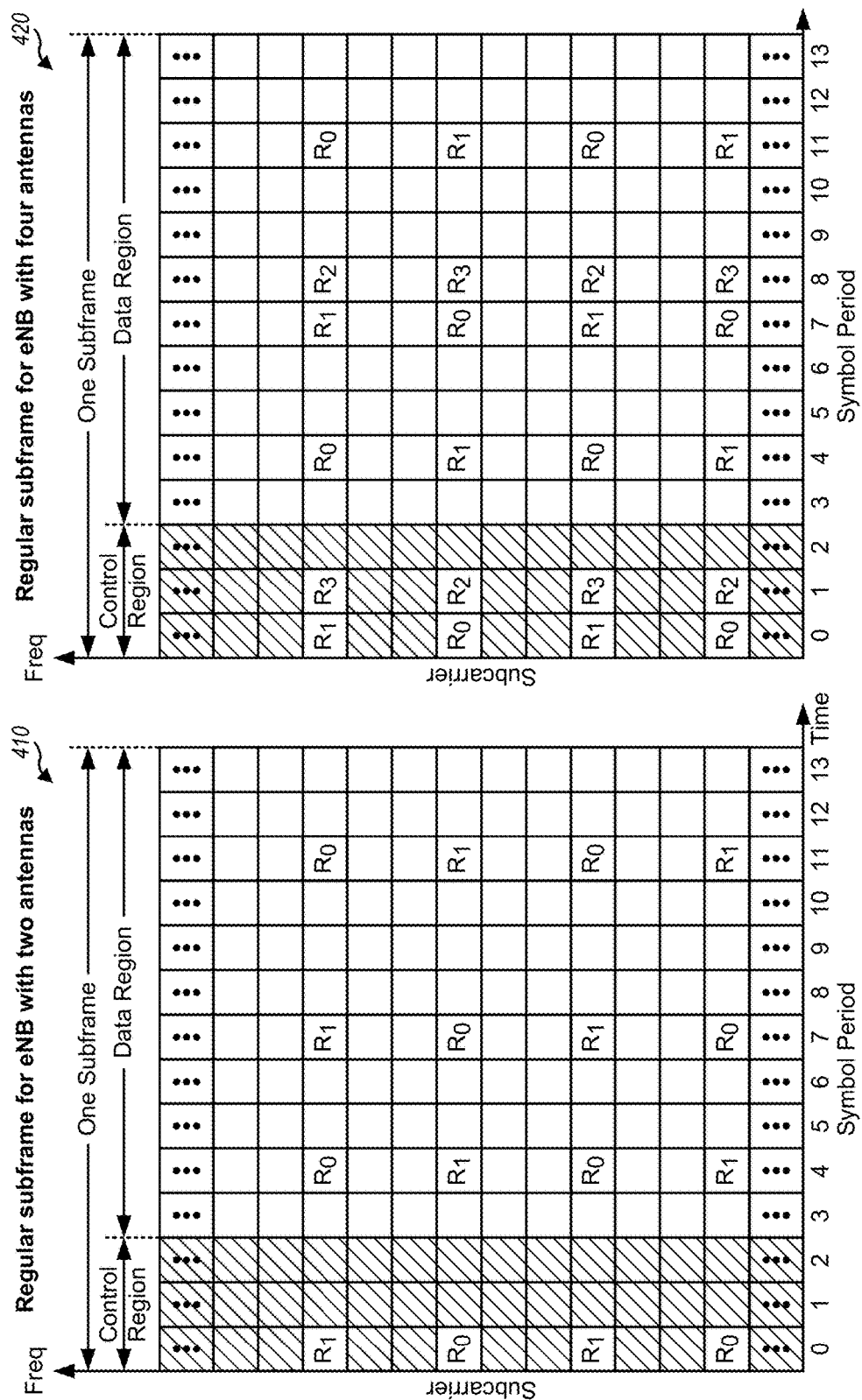
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to received by non-LC UEs. The new paging and RAR messages associated with LC UEs may also be repeated one or more times (e.g., "bundled"). In addition, different numbers of repetitions (e.g., different bundling sizes) for the new messages may be supported.

Example Narrowband Coexistence Within a Wideband System

As mentioned above, narrowband (e.g., MTC or NB-IoT) operation may be supported in the wireless communication network (e.g., in coexistence with LTE or some other RAT). Enhanced Machine-Type Communication (eMTC) is an enhanced form of MTC tailored to meet the requirements of IoT devices. eMTC is sometimes referred to by other names, such as BL/CE, where the BL stands for bandwidth reduced, low complexity and CE stands for coverage enhancement. Some of the enhancements for eMTC include support for narrowband and cross-subframe scheduling, and multiple repetitions of data and control information (referred to as bundling). An eNB may support both "legacy" UEs and eMTC UEs, while sharing the same system bandwidth FIGS. 5A and 5B, for example, illustrate an example of how LC UEs in MTC/eMTC operation may co-exist within a wideband system, such as LTE.

Figure 5A:
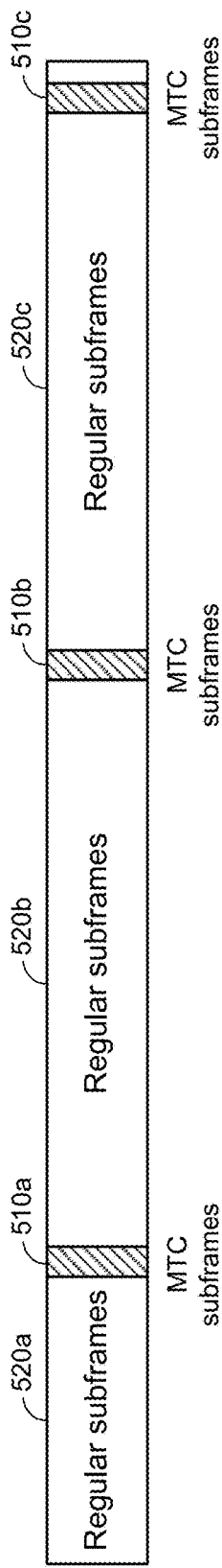
FIGS. 5A and 5B illustrate an example of MTC coexistence within a wideband system, such as LTE, in accordance with certain aspects of the present disclosure.

As illustrated in the example frame structure of FIG. 5A, subframes 510 associated with MTC and/or eMTC operation may be time division multiplexed (TDM) with regular subframes 520 associated with LTE (or some other RAT).

Figure 5B:
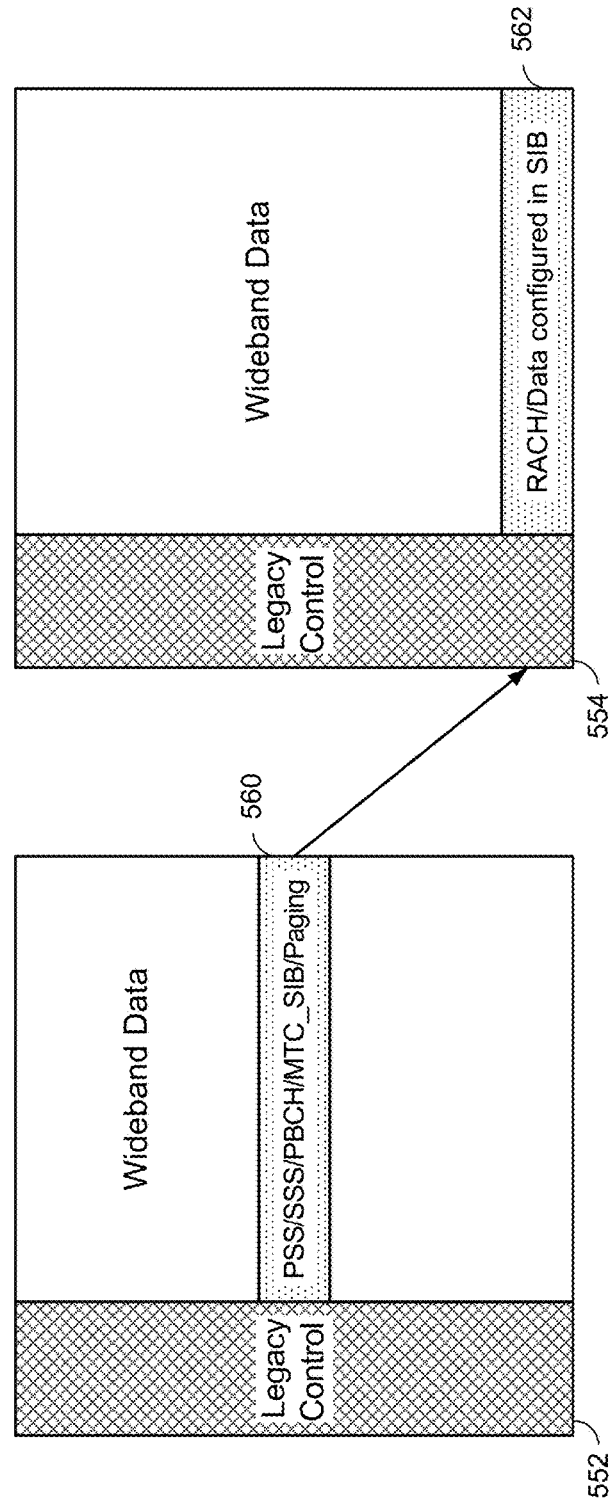

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 (e.g., spanning no more than 6 RBs of the wideband data) of a subframe 552 may be monitored by one or more LC UEs for either a PSS, SSS, PBCH, MTC signaling, or paging transmission from a BS in the wireless communication network. As also shown in FIG. 5B, a second narrowband region 562 (e.g., also spanning no more than 6 RBs of the wideband data) of a subframe 554 may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

Although the examples described herein assume a narrowband of 6 RBs, those skilled in the art will recognize that the techniques presented herein may also be applied to different sizes of narrowband regions.

Example Narrowband Management for MTC

As mentioned above, in certain systems, e.g., such as LTE Rel-12, narrowband operation for MTC (e.g., eMTC) may be supported. A cell supporting narrowband operation for MTC may have different system bandwidths for downlink (DL) and uplink (UL) operations. A cell having different DL and UL system bandwidths (SBs) may organize the DL system bandwidth into narrowband regions in a manner different than the manner used to organize the UL system bandwidth into narrowband regions. Accordingly, aspects of the present disclosure provide techniques for organizing a DL system bandwidth and an UL system bandwidth into narrowband regions.

A cell supporting narrowband operation for MTC and legacy UEs may receive legacy PUCCH transmissions from the legacy UEs. Legacy PUCCH transmissions may be transmitted at either or both edges of a UL system bandwidth of a cell. Accordingly, aspects of the present disclosure provide techniques to reserve transmission resources included in an UL narrowband region for use by legacy PUCCH transmissions. Similar reservations may also be applied to a DL narrowband region for use by other legacy DL signals or channels.

A cell supporting narrowband operations for MTC may also support transmission of sounding reference signals (SRS). The current minimum defined bandwidth for transmission of SRS is four RBs. However, as mentioned above, the bandwidth of narrowband regions is six RBs. The fact that six RBs are not divisible by four RBs presents challenges in managing SRS transmissions using four RBs in six-RB based narrowband operations. Accordingly, aspects of the present disclosure provide techniques for assigning transmission resources for transmission of SRS in a cell supporting narrowband operations (e.g., for MTC).

A cell operating with FDD may have a DL system bandwidth that is of a different size than the UL system bandwidth of the cell. For example, a cell may perform DL operations in a system bandwidth of ten MHz and UL operations in a five MHz system bandwidth. To support MTC operations and MTC UEs, the cell may organize the DL system bandwidth and the UL system bandwidth into narrowband regions, or narrowband regions. An eNB or other BS controlling the cell may assign a DL narrowband region to a MTC UE for the MTC UE to monitor for signals from the eNB. Similarly, the eNB (or other BS) may assign a UL narrowband region to the MTC UE for the MTC to use when transmitting UL signals. In the example, the cell may organize the DL system bandwidth into eight DL narrowband regions while organizing the UL system bandwidth into four UL narrowband regions.

When a BS (e.g., an eNB or a cell) supports MTC UEs with the DL system bandwidth and UL system bandwidth of the cell organized into narrowband regions, the BS may establish a mapping between DL narrowband regions and UL narrowband regions, so that assigning a DL narrowband region to an MTC UE implies an assignment of a UL narrowband region to that MTC UE. Having a mapping allows the BS to simplify scheduling of resources in the cell, e.g., the BS can expect ACK/NAKs for transmissions on a DL narrowband region to an MTC UE on the corresponding UL narrowband region. Likewise, an MTC UE monitors for DL transmissions on the assigned DL narrowband region for the MTC UE and responds with transmissions on the corresponding UL narrowband region.

According to aspects of the present disclosure, a technique for mapping UL and DL narrowband regions by a BS is provided. A BS may determine a minimum size of the UL system bandwidth and the DL system bandwidth supported by the BS, determine a number of narrowband regions that can be organized in the determined size, and then organize both the DL system bandwidth and the UL system bandwidth in that number of narrowband regions. The BS may then map each DL narrowband region to one UL narrowband region. For example, a cell may perform DL operations in a system bandwidth of ten MHz and UL operations in a five MHz system bandwidth. In the example, the BS may determine that the minimum size of the UL system bandwidth and the DL system bandwidth is five MHz, and then determine that the BS can organize four narrowband regions in a five MHz system bandwidth. Still in the example, the BS may then organize four DL narrowband regions in the DL system bandwidth and four UL narrowband regions in the UL system bandwidth, and map each DL narrowband region to one UL narrowband region.

Figure 6:
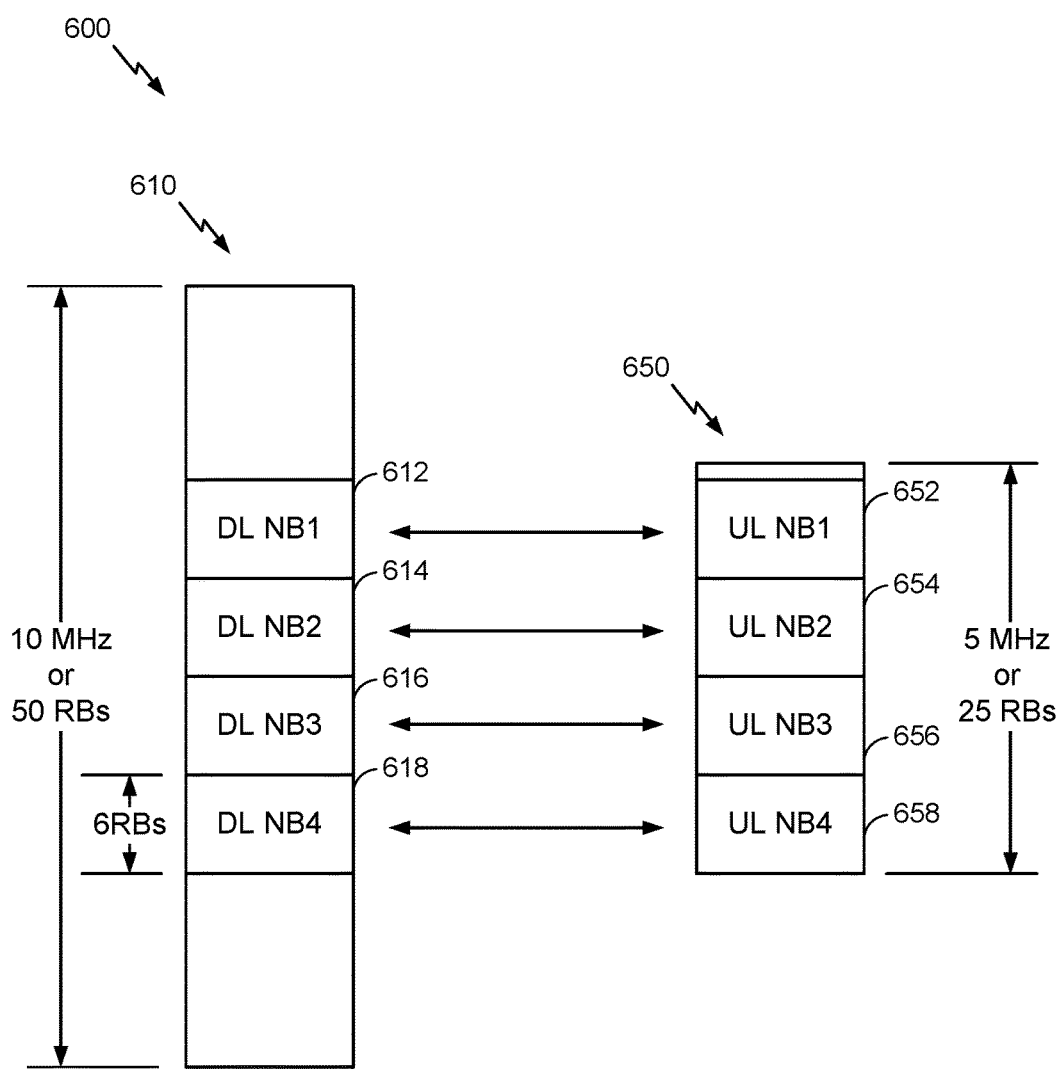
FIG. 6 illustrates an exemplary mapping of DL narrowband regions to UL narrowband regions, in accordance with certain aspects of the present disclosure.

FIG. 6 illustrates an exemplary mapping 600 of DL narrowband regions to UL narrowband regions, as described above. Such a mapping may be employed by eNB 110a in FIG. 1. While FIG. 6 shows the DL system bandwidth 610 and the UL system bandwidth 650 as apparently in the same frequency ranges, the DL system bandwidth and the UL system bandwidth are in different frequency ranges in a cell using FDD. DL system bandwidth 610 is ten MHz or fifty RBs wide, and UL system bandwidth 650 is five MHz or twenty-five RBs wide. A BS supporting MTC UEs while operating DL system bandwidth 610 and UL system bandwidth 650 may determine that the UL system bandwidth 650 is smaller than DL system bandwidth 610 (the 5 MHz size of UL system bandwidth 650 is the minimum size of the UL system bandwidth 650 and the DL system bandwidth 610). The BS may then determine that the BS can organize four narrowband regions 652, 654, 656, and 658 from the UL system bandwidth 650. The BS may then determine to organize four narrowband regions from the DL system bandwidth, and organize DL narrowband regions 612, 614, 616, and 618 from the DL system bandwidth. The BS may then map DL narrowband region 612 to UL narrowband region 652, DL narrowband region 614 to UL narrowband region 654, DL narrowband region 616 to UL narrowband region 656, and DL narrowband region 618 to UL narrowband region 658.

As mentioned above, LC MTC UEs were introduced in LTE Rel-12. Additional enhancements may be made in LTE Release 13 (Rel-13) to support MTC operations. For example, MTC UEs may be able to operate (e.g., monitor, transmit, and receive) in a narrowband region of 1.4 MHz or six RBs within wider system bandwidths (e.g., 1.4 MHz, 3 MHz, 5 MHz, 10 MHz, 15 MHz, 20 MHz). As a second example, base stations and MTC UEs may support coverage enhancements (CE) of up to 20 dB by some techniques, for example bundling. Coverage enhancement may also be referred to as coverage extension and range extension.

When a UE needs to connect with a cell to which the UE is not currently connected, the UE and the cell engage in an exchange of messages referred to as a random access channel (RACH) procedure. In a RACH procedure, a UE transmits a physical random access channel (PRACH) signal (sometimes referred to as Msg1 of a RACH procedure) in a set of transmission resources reserved for PRACH signals, then the cell responds to the PRACH signal with a random access response (RAR) message (sometimes referred to as Msg2 of a RACH procedure) carried on the downlink shared channel (DL-SCH). The UE responds to the RAR message with an RRC connection request message (sometimes referred to as Msg3 of a RACH procedure), and the cell responds with a contention resolution message (sometimes referred to as Msg4 of a RACH procedure). The UE is then connected with the cell.

In current (e.g., LTE Rel-12) wireless technologies, a PRACH signal transmitted by an MTC device comprises one group of 4 symbols in a single tone and using 2 hopping values.

Example Search Space Design for SPS in eMTC

Since eMTC UEs are typically concerned with only a narrowband of six RBs at a time, the traditional LTE channels that are carried in whole-system bandwidth (PDCCH, PHICH, PCFICH) are not reusable for eMTC and another mechanism is used to send control information to eMTC UEs. Since eNodeB may support both (legacy) LTE and eMTC devices simultaneously, a new channel for eMTC may be designed to avoid interfere with LTE operations. Such a channel, referred to as an MTC PDCCH (MPDCCH) has been introduced for eMTC, which uses the resource blocks from within the PDSCH segment of regular LTE.

Aspects of the present disclosure provide techniques that may simplify processing of MPDCCH transmissions. For example, aspects of the present disclosure may help define a search space, for eMTC UEs configured in a certain manner, that limits the number of blind decodes performed for detecting an MPDCCH transmission. The term search space generally refers to the set of valid decoding candidates for a channel, given available time and frequency resources and restrictions, such as the format of the channel. By restricting an eNB to selecting a decoding candidate from within the search space, a UE monitoring that search space should be able to detect the transmission.

Aspects of the present disclosure may help provide a defined search space that limits a number of blind decodes an eMTC configured in a certain manner may need to perform by providing a common format transmitting different types of downlink control information (DCI), which may help address a challenge presented by supporting different features that may be in contention. For example, supporting both semi-persistent scheduling (SPS) and different transmission modes, may present challenges to convey DCI.

The transmission modes can be broadly classified into two main modes of closed loop (e.g., based on CSI feedback) and open loop. An example of an open loop scheme is Space Frequency Block Code transmit diversity, where each one of multiple transmit antennas at a transmitter sends the same data to multiple receive antennas at the receiver without the need to know the channel state. An example of a closed loop scheme is closed loop beamforming that relies on CSI feedback from the UE. LTE supports ten transmission modes (TM1-TM10) that include a single transmit antenna mode and various open and closed loop multi-antenna modes.

SPS allows an eMTC UE to support multiple PDSCH allocations, without requiring to send a separate MPDCCH for each of them. With SPS, the UE is pre-configured by the eNB with an SPS cell Radio Network Temporary Identifier (SPS-RNTI) and a periodicity. Once pre-configured, if the UE were to receive an allocation (DL/UL grant) using the SPS-RNTI (to scramble cyclic redundancy check bits) instead of the typical cell specific RNTI (C-RNTI), then the corresponding allocation would repeat according to the pre-configured periodicity.

In some cases, however, SPS may not be supported in certain transmission modes. For example, LTE transmission mode 6 (TM6) does not support SPS, so if the UE is configured with SPS and TM6, the transmission scheme is transmit diversity (the Tx Scheme used in TM2). This presents some ambiguity, as to whether the UE should monitor for a first DCI format that is specific to TM2 or a second DCI format that is specific to TM6.

Due to this ambiguity, a UE configured with SPS and TM6 may have to monitor both DCI formats 6-1A (the DCI for PDSCH), one DCI 6-1A for the C-RNTI (i.e., the non-SPS transmission) and another DCI for the SPS C-RNTI (for SPS retransmissions). These two DCI 6-1A may have different sizes, which increases the number of blind decodes at the UE. This may not be an issue for legacy LTE UEs, since such UEs monitor for DCI 1A in the UE-specific search space.

However, for eMTC UEs, this is not the case. In eMTC, the UE may only monitor the "mode specific" DCI in the UE-specific search space. Thus, if a UE is configured with SPS and TM6, the UE would monitor the following:
  TM6 DCI for C-RNTI
  TM2 DCI for SPS C-RNTI
Unfortunately, this will increase the number of blind decodings at the UE side, since the TM2 and 6 DCI have different sizes. Different DCI formats may have different sizes and carry different sets of information. For example, since TM6 uses closed loop spatial multiplexing, its DCI (format 6-1A) has fields carrying precoding information, such as a transmitted precoding matrix indication (TPMI) field that indicates which codebook index is used and a PMI confirmation field that indicates whether a recommended precoding matrix from the UE was used or overridden. This information is not needed for TM2.

Aspects of the present disclosure provide techniques that may help reduce the number of blind decoding by providing a search space design for DCI formats that reduce a number of blind decodes performed by a UE.

Figure 7:
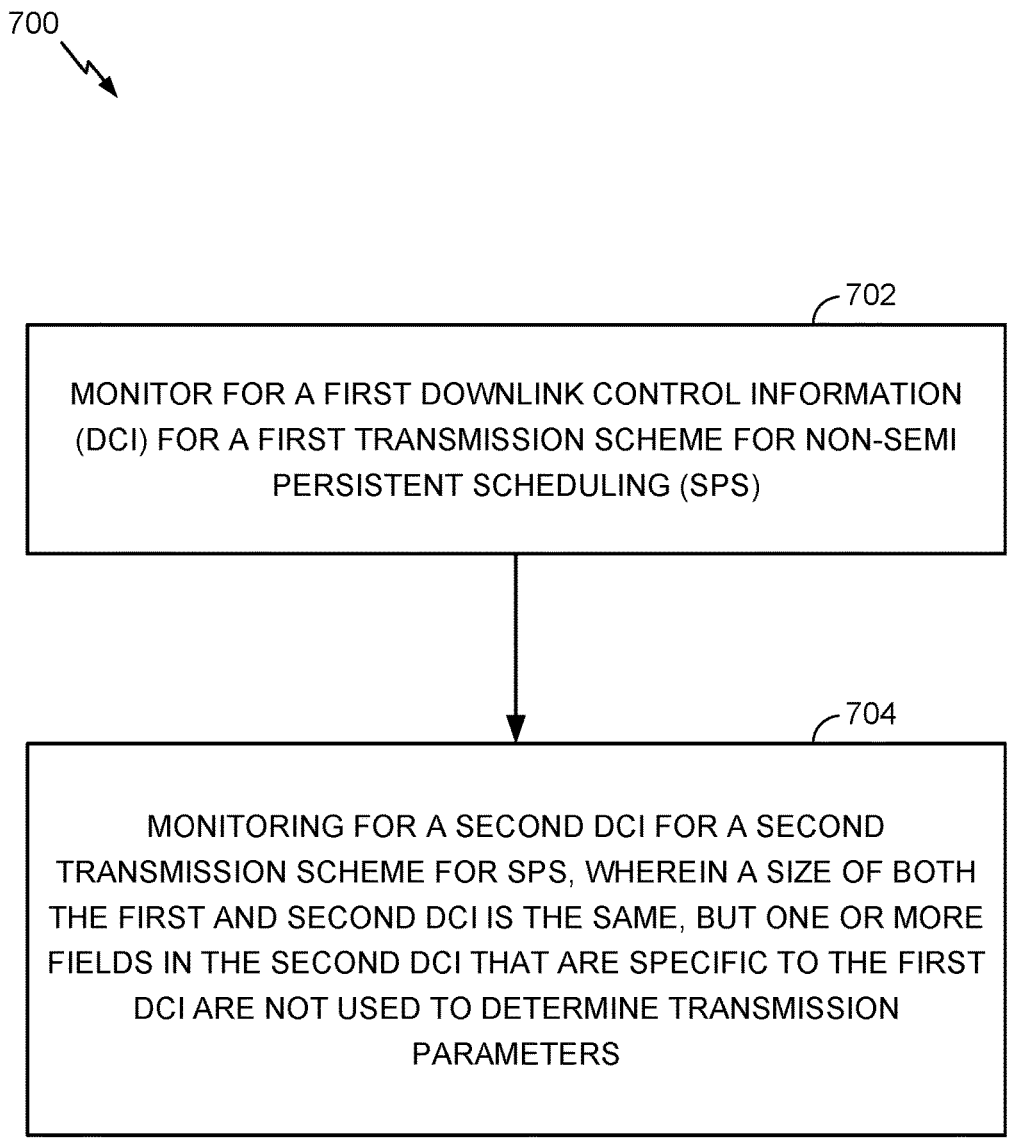
FIG. 7 illustrates example operations for wireless communications that may be performed by a UE, in accordance with certain aspects of the present disclosure.

FIG. 7 illustrates example operations 700 a UE may perform based on the proposed scheme. Operations 700 may be performed, for example, by a UE, such as UE 120 shown in FIG. 2.

The operations begin, at 702, by monitoring for a first downlink control information (DCI) for a first transmission scheme for non-semi persistent scheduling (SPS). At 704, the UE monitors for a second DCI for a second transmission scheme for SPS, wherein a size of both the first and second DCI is the same, but one or more fields in the second DCI that are specific to the first DCI are not used to determine transmission parameters.

Figure 8:
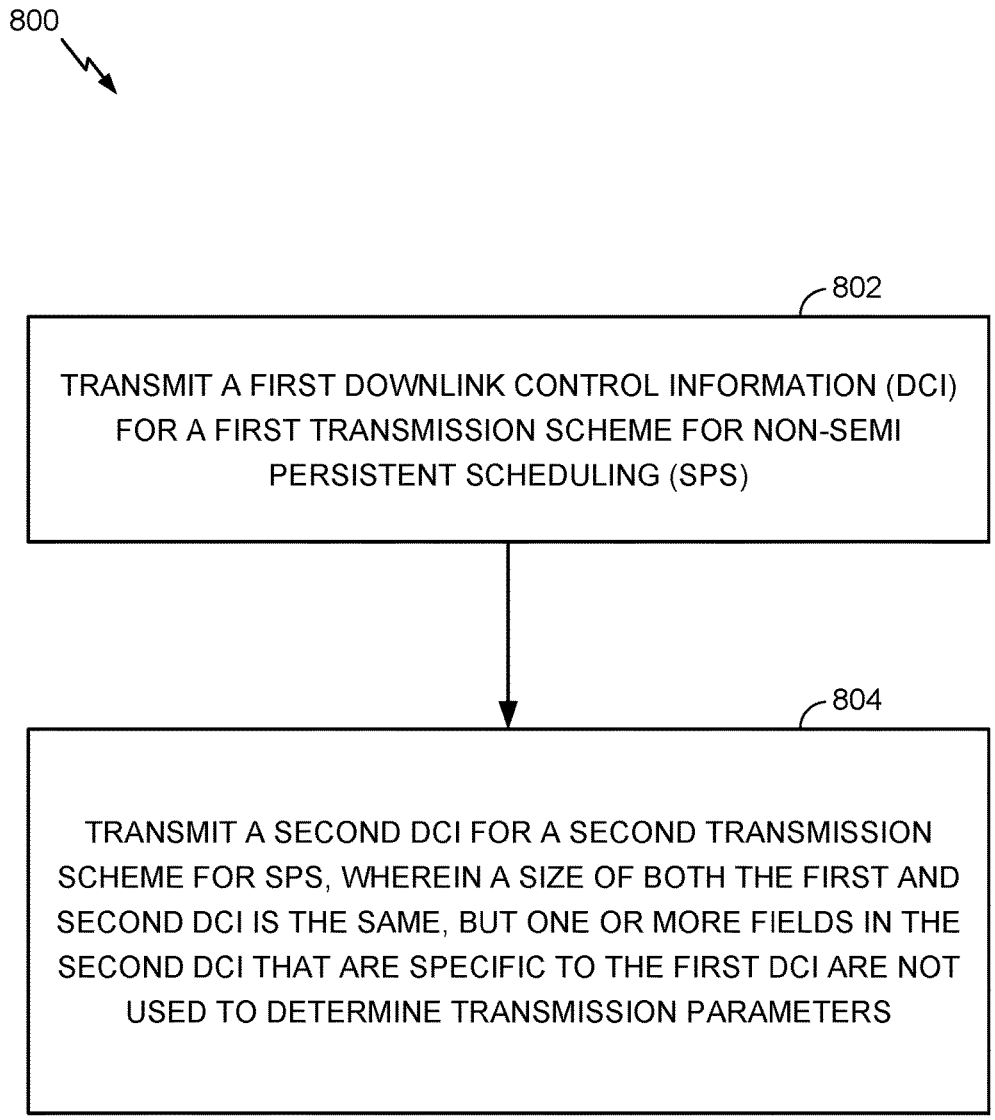
FIG. 8 illustrates example operations for wireless communications that may be performed by a base station, in accordance with certain aspects of the present disclosure.

FIG. 8 illustrates example operations 800 a base station (e.g., an eNB) may perform based on the proposed scheme. Operations 800 may be performed by a base station, such as base station 120 shown in FIG. 2, communicating with a UE performing operations 700 described above.

The operations begin, at 802, by transmitting a first downlink control information (DCI) for a first transmission scheme for non-semi persistent scheduling (SPS). At 804, the base station transmits a second DCI for a second transmission scheme for SPS, wherein a size of both the first and second DCI is the same, but one or more fields in the second DCI that are specific to the first DCI are not used to determine transmission parameters By making the two different DCIs the same size, complexity at the UE (in terms of number of blind decodes) may be reduced. In other words, since the DCIs are the same size, the UE may monitor a search space with decoding candidates for both types of DCI by doing a single decode per candidate.

In the example referenced above, the fields containing the precoding information only have meaning for the transmission scheme related to TM6 (transmit PMI information), and do not have meaning for TM2.

Therefore, applying aspects of the present disclosure to this example, these two fields (typically not present when used with SPS C-RNTI) may also be present in the DCI when they are used for SPS C-RNTI, such that the DCIs (form TM6 and TM2) are the same length. However, the values of these fields, when used for SPS C-RNTI, may be set to a reserved value (e.g., 0). By setting these fields to reserved values when the DCI is sent using SPS CORNTI, the UE may be able to use these bits, in effect, as additional "CRC" value to prune out grants.

In other words, if a UE finds a DCI transmission scrambled with SPS C-RNTI, it would expect these bits to be set to the reserved value. After checking, if the value of the field(s) are not the reserved value (e.g., 0), the UE may discard the corresponding DCI (e.g., UL or DL grant). As illustrated in table 900 shown in FIG. 9, a UE may not need to separately monitor SPS C-RNTI DCIs in the common search space. Rather, as shown, the UE may monitor UE specific search space for TM2 and TM6 DCI. As described above, for TM6, the DCI scrambled by SPS C-RNTI contains the TPMI information, but its contents may be reserved to allow the UE to use the same blind decoding for C-RNTI as SPS C-RNTI.

As described herein, aspects of the present disclosure provide techniques that may help achieve objectives of supporting SPS and multiple transmission modes, while also providing an efficient search space for both SPS and non-SPS DCI.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE) comprising:
    monitoring for a first downlink control information (DCI) for a first transmission scheme for non-semi persistent scheduling (non-SPS); and
    monitoring for a second DCI for a second transmission scheme for semi persistent scheduling (SPS), wherein a size of both the first and second DCI is the same, but one or more fields in the second DCI that are specific to the first DCI are not used to determine transmission parameters.

2. The method of claim 1, further comprising:
    detecting the second DCI based on the monitoring;
    checking if bit values of one or more of the fields are set to reserved values; and
    if not, discarding the second DCI.

3. The method of claim 1, wherein the second DCI is transmitted in a message having a cyclic redundancy check (CRC) value scrambled with an SPS cell specific radio network temporary identifier (SPS C-RNTI).

4. The method of claim 3, wherein the first DCI is transmitted in a message having a CRC value scrambled with a different type of C-RNTI than the SPS C-RNTI.

5. The method of claim 1, wherein:
    the second transmission scheme comprises a transmit diversity transmission scheme; and
    the first transmission scheme comprises a closed loop beamforming transmission scheme.

6. The method of claim 5, wherein the one or more fields carry precoding information used for the closed loop beamforming transmission scheme.

7. The method of claim 5, further comprising providing feedback for the close loop beamforming transmission scheme.

8. A method for wireless communications by a base station, comprising:
    transmitting a first downlink control information (DCI) for a first transmission scheme for non-semi persistent scheduling (non-SPS); and
    transmitting a second DCI for a second transmission scheme for semi persistent scheduling (SPS), wherein a size of both the first and second DCI is the same, but one or more fields in the second DCI that are specific to the first DCI are not used to determine transmission parameters.

9. The method of claim 8, further comprising:
    setting bit values of one or more of the fields in the second DCI to reserved values.

10. The method of claim 8, wherein the second DCI is transmitted in a message having a cyclic redundancy check (CRC) value scrambled with an SPS cell specific radio network temporary identifier (SPS C-RNTI).

11. The method of claim 10, wherein the first DCI is transmitted in a message having a CRC value scrambled with a different type of C-RNTI than the SPS C-RNTI.

12. The method of claim 8, wherein:
    the second transmission scheme comprises a transmit diversity transmission scheme; and
    the first transmission scheme comprises a closed loop beamforming transmission scheme.

13. The method of claim 12, wherein the one or more fields carry precoding information used for the closed loop beamforming scheme.

14. The method of claim 12, further comprising receiving feedback for the close loop beamforming transmission scheme.

15. An apparatus for wireless communications by a user equipment (UE) comprising:
    means for monitoring for a first downlink control information (DCI) for a first transmission scheme for non-semi persistent scheduling (non-SPS); and
    means for monitoring for a second DCI for a second transmission scheme for semi persistent scheduling (SPS), wherein a size of both the first and second DCI is the same, but one or more fields in the second DCI that are specific to the first DCI are not used to determine transmission parameters.

16. The apparatus of claim 15, further comprising:
    means for detecting the second DCI based on the monitoring;
    means for checking if bit values of one or more of the fields are set to reserved values; and
    means for discarding the second DCI if the bit values are not set to the reserved values.

17. The apparatus of claim 15, wherein the second DCI is transmitted in a message having a cyclic redundancy check (CRC) value scrambled with an SPS cell specific radio network temporary identifier (SPS C-RNTI).

18. The apparatus of claim 17, wherein the first DCI is transmitted in a message having a CRC value scrambled with a different type of C-RNTI than the SPS C-RNTI.

19. The apparatus of claim 15, wherein:
    the second transmission scheme comprises a transmit diversity transmission scheme; and
    the first transmission scheme comprises a closed loop beamforming transmission scheme.

20. The apparatus of claim 19, wherein the one or more fields carry precoding information used for the closed loop beamforming transmission scheme.

21. The apparatus of claim 19, further comprising means for providing feedback for the close loop beamforming transmission scheme.

22. An apparatus for wireless communications by a base station, comprising:
    means for transmitting a first downlink control information (DCI) for a first transmission scheme for non-semi persistent scheduling (non-SPS); and
    means for transmitting a second DCI for a second transmission scheme for semi persistent scheduling (SPS), wherein a size of both the first and second DCI is the same, but one or more fields in the second DCI that are specific to the first DCI are not used to determine transmission parameters.

23. The apparatus of claim 22, further comprising:
    means for setting bit values of one or more of the fields in the second DCI to reserved values.

24. The apparatus of claim 19, wherein the second DCI is transmitted in a message having a cyclic redundancy check (CRC) value scrambled with an SPS cell specific radio network temporary identifier (SPS C-RNTI).

25. The apparatus of claim 21, wherein the first DCI is transmitted in a message having a CRC value scrambled with a different type of C-RNTI than the SPS C-RNTI.

26. The apparatus of claim 19, wherein:
    the second transmission scheme comprises a transmit diversity transmission scheme; and
    the first transmission scheme comprises a closed loop beamforming transmission scheme.

27. The apparatus of claim 23, wherein the one or more fields carry precoding information used for the closed loop beamforming scheme.

28. The apparatus of claim 23, further comprising means for receiving feedback for the close loop beamforming transmission scheme.

\* \* \* \* \*